United States Patent
Chao (10) Patent No.: US 8,004,578 B2
(45) Date of Patent: Aug. 23, 2011

(54) AUTOMATIC FLICKER DETECTION AND CORRECTION APPARATUS AND METHOD IN A VIDEO CAPTURE DEVICE

(75) Inventor: Kun-Yuan Chao, Fongshan (TW)

(73) Assignee: Sunplus mMedia Inc., Hsinchu (TW)

( * ) Notice: Subject to any disclaimer, the term of this patent is extended or adjusted under 35 U.S.C. 154(b) by 756 days.

(21) Appl. No.: 12/153,915

(22) Filed: May 28, 2008

(65) Prior Publication Data
US 2009/0147103 A1    Jun. 11, 2009

(30) Foreign Application Priority Data
Dec. 7, 2007   (TW) .............................. 96146708 A (51) Int. Cl.
*H04N 9/73*    (2006.01)
*H04N 5/235*   (2006.01)
(52) U.S. Cl. ............... 348/226.1; 348/228.1; 348/222.1
(58) Field of Classification Search ............. 348/221.1, 348/226.1, 228.1, 447, E5.11, FOR. 203
See application file for complete search history.

(56) References Cited

U.S. PATENT DOCUMENTS

| | | | |
|---|---|---|---|
| 7,034,870 B2 * | 4/2006 | Nagaoka et al. | 348/228.1 |
| 7,639,285 B2 * | 12/2009 | Nomura et al. | 348/228.1 |
| 2006/0061669 A1 * | 3/2006 | Jang et al. | 348/226.1 |
| 2007/0153094 A1 | 7/2007 | Noyes et al. | |

* cited by examiner

*Primary Examiner* — Lin Ye
*Assistant Examiner* — Euel Cowan
(74) *Attorney, Agent, or Firm* — Bacon & Thomas, PLLC (57) ABSTRACT

To automatically detect and correct flickers in a video capture device, a frame number generator receives a plurality of frames and generates frame numbers. A storage device stores brightness values of partial pixels of a frame numbered 1. An extractor extracts brightness values of partial pixels of a frame numbered N. A difference summation device computes differences of the brightness values of the partial pixels of the frames numbered 1 and numbered N and sums up the differences to generate a brightness difference summation signal. A flicker detector detects a banding value in the brightness difference summation signal. A flicker corrector uses the banding value and the frame numbers to find a fixed frequency flicker effect in the frames, and generates a flicker correction signal when the fixed frequency flicker effect in the frames is found.

16 Claims, 5 Drawing Sheets

AUTOMATIC FLICKER DETECTION AND CORRECTION APPARATUS AND METHOD IN A VIDEO CAPTURE DEVICE

BACKGROUND OF THE INVENTION

1. Field of the Invention

The present invention relates to a technical field of image processing and, more particularly, to an automatic flicker detection and correction apparatus and method in a video capture device.

2. Description of Related Art

Typically, the illuminants have different frequency flickers due to the different AC frequencies in different countries. The AC frequencies are essentially divided into two types: 60 Hz such as in Taiwan where a light has a period of $\frac{1}{120}$ second per flicker, and 50 Hz such as in China where a light has a period of $\frac{1}{100}$ second per flicker. For capturing an image by a CMOS video capture device under such an environment, every horizontal line of an image frame has the uniform exposure amount when the exposure time is set to a multiple of one flicker period of environment lighting, and no flicker appears on the image frame. However, flicker may occur since the exposure amount on every line of the image frame is not uniform when the exposure time is not equal to a multiple of one flicker period of environment lighting.

To overcome the flicker on the image captured by the CMOS video capture device, US Patent Application Publication No. 2007/0153094 has disclosed an "Automatic flicker correction in an image capture device", which uses the differences of the total brightness of every horizontal line of two adjacent frames to detect fixed frequency flicker, and the detected frequency to correct the exposure time of the image capture device when the fixed frequency flicker is detected.

However, such a correction cannot detect the original frequency after the differences of the total brightness of every line, which are small or even almost zero when the flicker effect on the image caused by illumination source is very light, are passed through a low pass filter (LPF). In addition, for finding the differences of the total brightness of every line of the adjacent frames, the total brightness of every line of the first frame is temporarily stored in the memory, and if the size (640×480) of a popular VGA frame is considered, the memory size required for storing 480 brightness values (in the way of 18 bits per brightness value) is 8640 bits (=1080 bytes). After the differences of the total brightness of all lines are obtained and passed through the LPF, the differences are further passed through a derivative calculator, which requires a huge amount of computation and thus takes much time to affect the normal display rate.

Therefore, it is desirable to provide an improved detection and correction apparatus to mitigate and/or obviate the aforementioned problems.

SUMMARY OF THE INVENTION

The object of the present invention is to provide an automatic flicker detection and correction apparatus and method in a video capture device, which can effectively detect an oblique line in a chromatic mixture signal.

In accordance with a feature of the invention, there is provided an automatic flicker detection and correction apparatus in a video capture device, which includes a frame number generator, a storage device, an extractor, a difference summation device, a flicker detector and a flicker corrector. The frame number generator receives a plurality of frames and accordingly generates frame numbers. The storage device is connected to the frame number generator in order to store brightness values of partial pixels of a frame numbered one. The extractor is connected to the frame number generator in order to extract brightness values of partial pixels of a frame not numbered one. The difference summation device is connected to the storage device and the extractor in order to compute differences of the brightness values of the partial pixels of the frames numbered one and not numbered one and to sum the differences to thereby generate a brightness difference summation signal. The flicker detector is connected to the difference summation device in order to detect a banding value in the brightness difference summation signal. The flicker corrector is connected to the flicker detector and the frame number generator in order to use the banding value and the frame numbers to find a fixed frequency flicker effect in the frames, and to generate a flicker correction signal when the fixed frequency flicker effect in the frames is found.

In accordance with another feature of the invention, there is provided a video capture device with automatic flicker detection and correction, which includes an image sensor, an image processor, an automatic detection and correction unit and an image sensor controller. The image sensor captures a plurality of frames. The image processor is connected to the image sensor in order to perform an image processing on the frames to thereby produce a plurality of processed frames. The automatic flicker detection and correction apparatus is connected to the image processor in order to receive the processed frames, compute brightness differences of partial pixels of a processed frame numbered one and multiple processed frames not numbered one, sum the brightness differences to accordingly generate a brightness difference summation signal, detect a banding value in the brightness difference summation signal to thereby determine whether a fixed frequency flicker effect exists in the processed frames, and generate a flicker correction signal when the fixed frequency flicker effect exists in the processed frames. The image sensor controller is connected to the image sensor and the automatic flicker detection and corrector apparatus in order to use the flicker correction signal to adjust operating parameters of the image sensor.

In accordance with a further feature of the invention, there is provided an automatic flicker detection and correction method in a video capture device, which includes: (A) numbering a plurality of frames to accordingly generate frame numbers; (B) storing brightness values of partial pixels of a frame numbered one; (C) extracting brightness values of partial pixels of a frame not numbered one; (D) calculating differences of the brightness values of the partial pixels of the frames numbered one and not numbered one, and summing the differences to accordingly generate a brightness difference summation signal; (E) detecting a banding value in the brightness difference summation signal; and (F) using the banding value and the frame numbers to find a fixed frequency flicker effect in the frames, and generating a flicker correction signal to accordingly correct an image sensor of the video capture device when the fixed frequency flicker effect in the frames is found.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
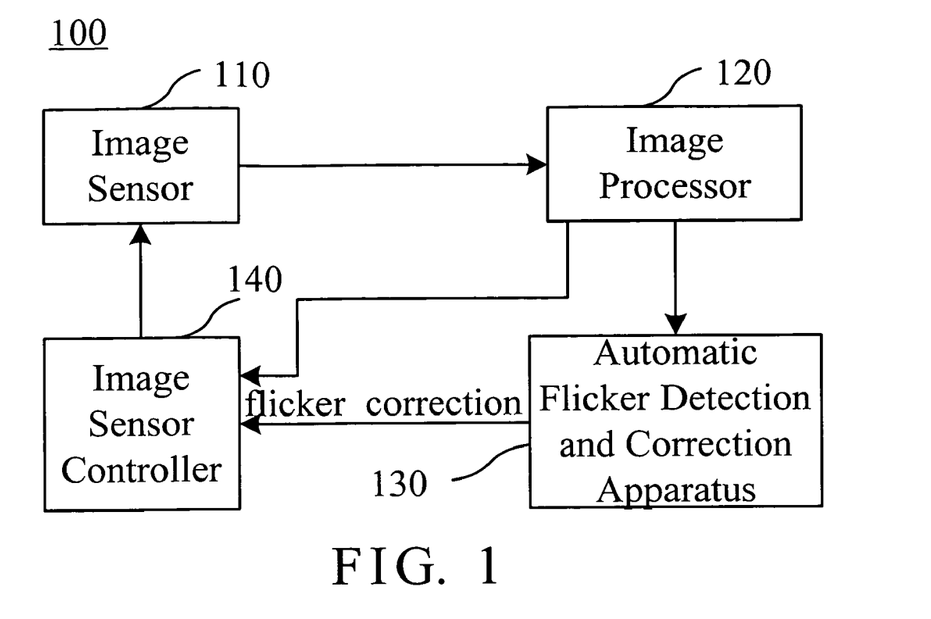
FIG. 1 is a block diagram of a video capture device with automatic flicker detection and correction in accordance with the invention.

FIG. 1 is a block diagram of a video capture device 100 with automatic flicker detection and correction in accordance with the invention. In FIG. 1, the device 100 includes an image sensor 110, an image processor 120, an automatic flicker detection and correction apparatus 130, and an image sensor controller 140.

The image sensor 110 captures a plurality of frames. The image sensor 110 can be a CMOS or CCD array image sensor.

The image processor 120 is connected to the image sensor 110 in order to perform an image processing on the frames to thereby produce a plurality of processed frames.

The automatic flicker detection and correction apparatus 130 is connected to the image processor 120 in order to receive the processed frames, compute brightness differences of partial pixels of a processed frame numbered one and multiple processed frames not numbered one, sum up the brightness differences to accordingly generate a brightness difference summation signal, detect a banding value in the brightness difference summation signal to thereby determine whether a fixed frequency flicker effect exists in the processed frames, and generate a flicker correction signal when the fixed frequency flicker exists in the frames.

The image sensor controller 140 assumes that a background light source is at 60 Hz, and accordingly sets a shutter time and a frame rate of the image sensor 110 to $1/120$ sec. and 30 frame/sec., respectively, when the video capture device 100 is powered on.

When the video capture device 100 is powered on, the image processor 120 adjusts a gain of the image sensor 110 through the image sensor controller 140 in order to extract the frames. The image processor 120 performs an auto-focusing (AF) process based on the frames in order to help the image processor 12 to clearly extract the images.

When the image sensor controller 140 receives the flicker correction signal, it means that the background light source (such as a fluorescent light) does not use an AC frequency of 60 Hz, and in this case the shutter time of the image sensor is adjusted to a multiple of $1/100$ second.

Figure 2:
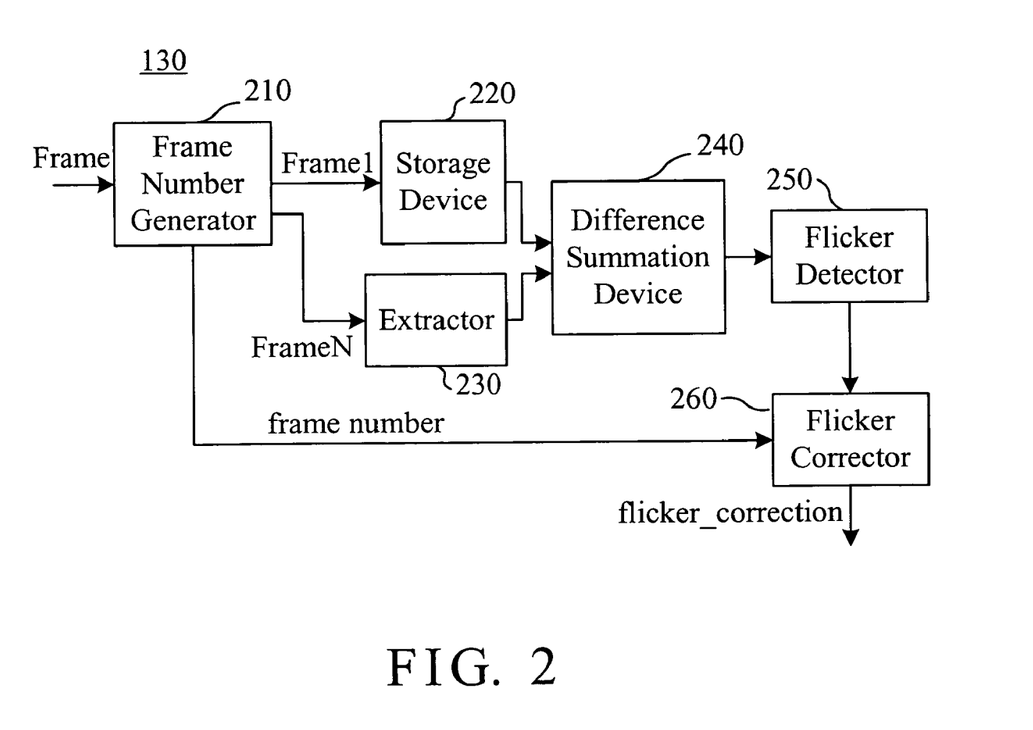
FIG. 2 is a block diagram of an automatic detection and correction apparatus in accordance with the invention.

FIG. 2 is a block diagram of the automatic flicker detection and correction apparatus 130 in accordance with the invention. In FIG. 2, the apparatus 130 includes a frame number generator 210, a storage device 220, an extractor 230, a difference summation device 240, a flicker detector 250, and a flicker corrector 260.

The frame number generator 210 is connected to the image processor 120 in order to receive the processed frames and generate the frame numbers based on the processed frames in sequence.

The storage device 220 is connected to the frame number generator 210 in order to store the brightness values of the partial pixels of a processed frame numbered one (such as the first frame).

The extractor 230 is connected to the frame number generator 210 in order to extract the brightness values of the partial pixels of each processed frame not numbered one (such as the processed frame with a frame number greater than one).

The positions for storing the partial pixels of the processed frame numbered one in the storage device 220 correspond to the positions of the partial pixels of each processed frame not numbered one that are extracted by the extractor 230.

The difference summation device 240 is connected to the storage device 210 and the extractor 220 in order to compute differences of the brightness values of the partial pixels of the processed frames numbered one and not numbered one, and to sum up the differences to thereby generate a brightness difference summation signal Y_Diff_Sum(n), which is expressed as follows.

$$Y\_Diff\_Sum(n) = \sum_{x=1}^{k} (|Y_x^n - Y_x^1|), k \le 1000,$$

where $Y_x^1$ indicates the brightness values of the partial pixels of the processed frame numbered one, $Y_x^n$ indicates the brightness values of the partial pixels of the processed frame not numbered one for N is a positive integer greater than one, and k indicates a number of the partial pixels.

The flicker detector 250 is connected to the difference summation device 240 in order to detect a banding value, denoted as banding_value, in the brightness difference summation signal.

Figure 3:
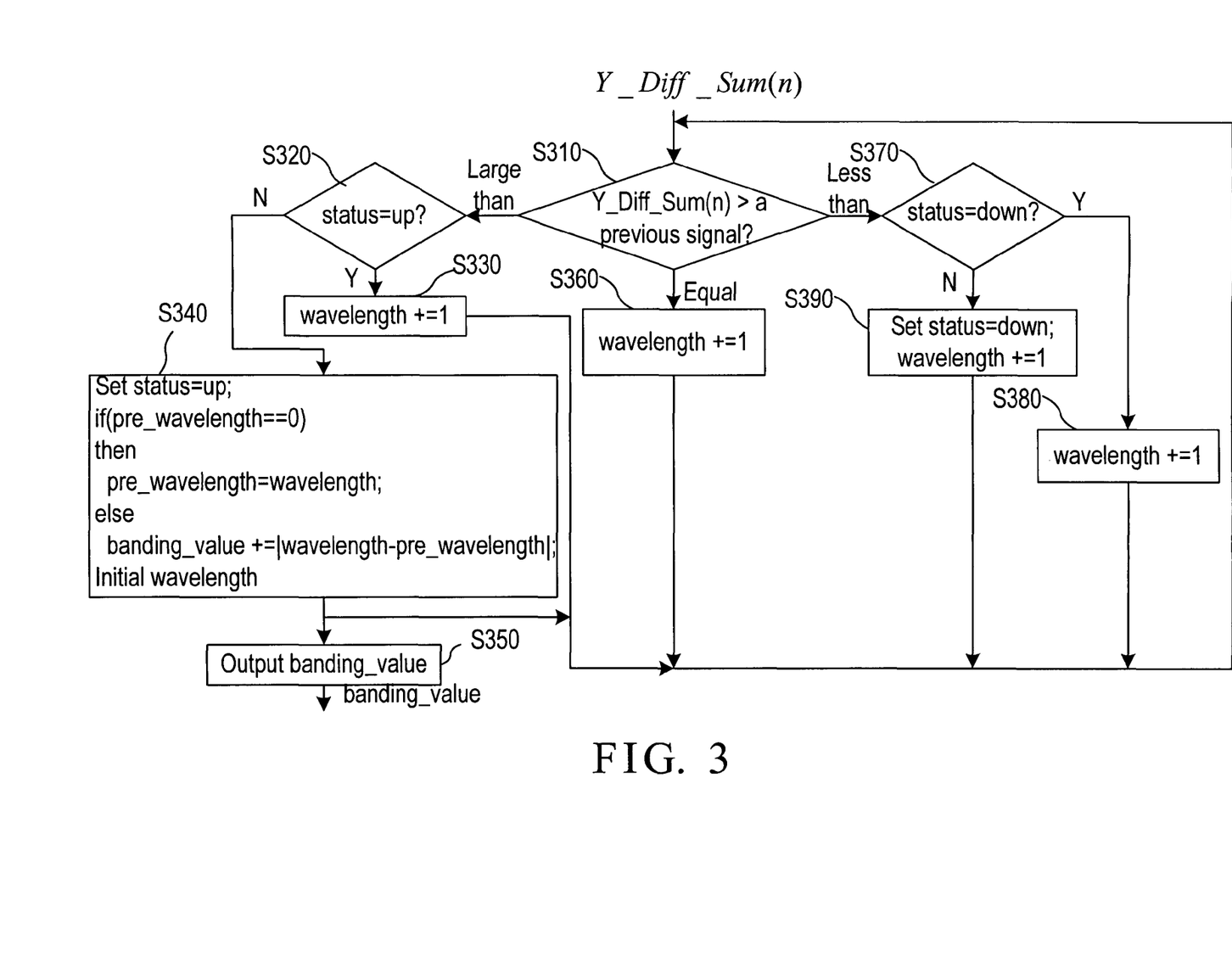
FIG. 3 is a control flowchart of a flicker detector in accordance with the invention.

FIG. 3 is a control flowchart of the flicker detector 250 in accordance with the invention. As shown in FIG. 3, step S310 compares the brightness difference summation signal Y_Diff_Sum(n) with a previous signal. When the signal Y_Diff_Sum(n) is greater than the previous signal, step S320 determines a status to be up or not. When status=up, it indicates that the signal Y_Diff_Sum(n) is at a rising edge of a waveform, and in this case step S330 adds one to a variable of wavelength.

Conversely, when status=up is not found, it indicates that the signal Y_Diff_Sum(n) is at a position just out of a valley, and in this case step S340 sets status=up and further determines a variable of pre_wavelength to be zero (initial value) or not. When pre_wavelength=0, it indicates that the first valley of the signal Y_Diff_Sum(n) is not formed, and in this case pre_wavelength=wavelength is set. When pre_wavelength=0 is not found, an absolute value of subtracting the variable pre_wavelength from the variable wavelength is taken, and the banding value banding_value plus the absolute value is set. Next, the variable of wavelength is initialized by setting the variable of wavelength to one.

Next, step S350 outputs the banding value banding_value.

In step S310, when the signal Y_Diff_Sum(n) is equal to the previous signal, it indicates that the signal Y_Diff_Sum(n) is at a peak, and in this case the variable of wavelength is added by one (step S360).

In step S310, when the signal Y_Diff_Sum(n) is smaller than the previous signal, it further determines whether the status is down (step S370). When status=down, it indicates that the signal Y_Diff_Sum(n) is at a falling edge of the waveform, and in this case step S380 adds one to the variable of wavelength. Conversely, when status=down is not found, it indicates that the signal Y_Diff_Sum(n) is at a position just out of a peak, and in this case step S390 sets status=down and adds one to the variable of wavelength.

The flicker corrector 260 is connected to the flicker detector 250 and the frame number generator 210 in order to use the banding value banding_value and the frame numbers to find a fixed frequency flicker effect in the processed frames and to generate a flicker correction signal, denoted as flicker_correction, when the fixed frequency flicker effect in the frames is found.

Figure 4:
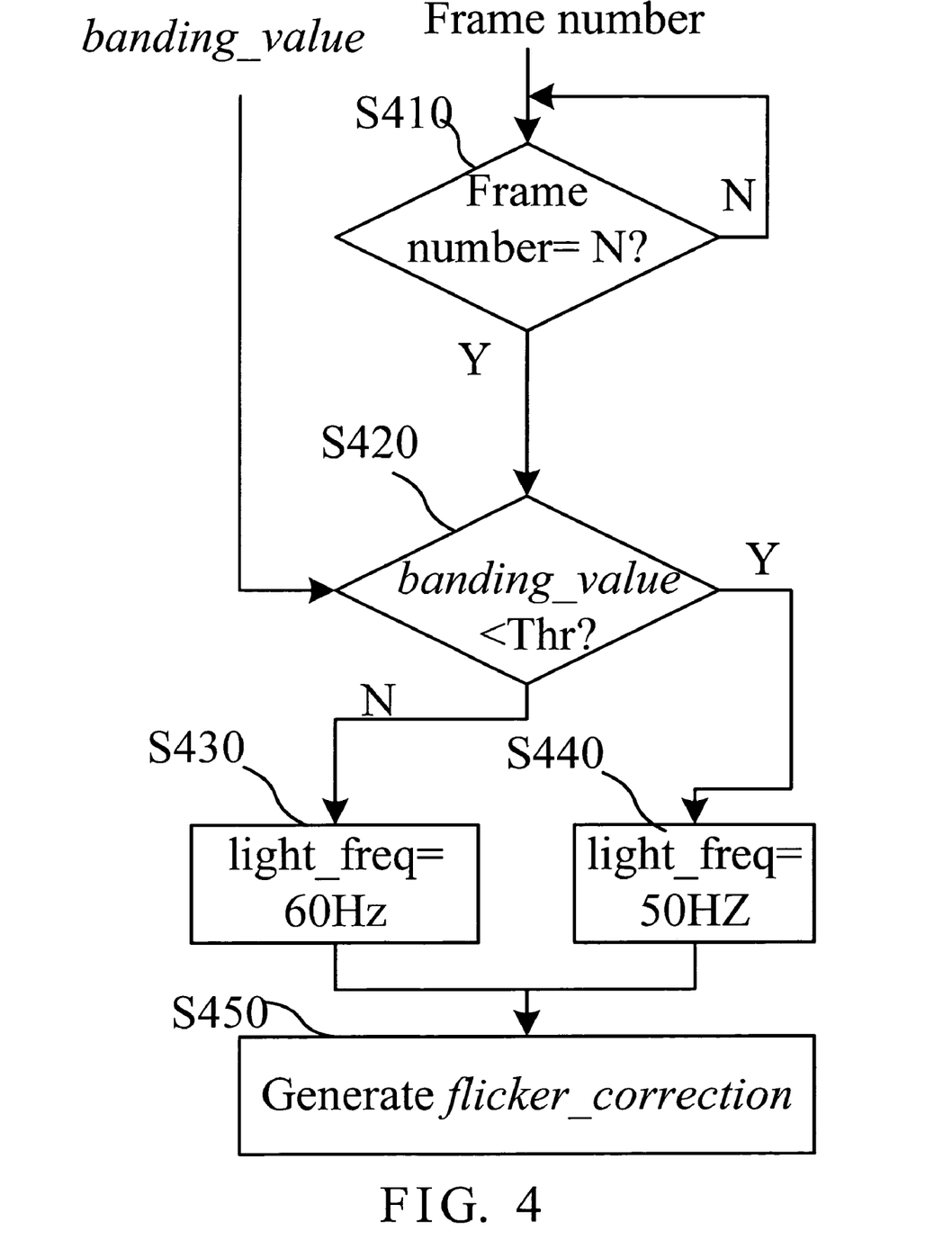
FIG. 4 is a control flowchart of a flicker corrector in accordance with the invention.

FIG. 4 is a control flowchart of the flicker corrector 260 in accordance with the invention. As shown in FIG. 4, step S410 determines whether the frame number is equal to a predetermined value N. When the frame number is equal to the value N, step S420 determines whether the banding value banding_value is smaller than a threshold Thr. When the banding value banding_value is smaller than a threshold Thr, it indicates that the waveform forming the signal Y_Diff_Sum(n) has almost identical wavelengths, which means that the fixed frequency flicker effect appears in the frames extracted. Accordingly, since the flicker effect appears, it is incorrect to assume that a background light source is at 60 Hz when the video capture device 100 is powered on, and thus step S440 sets a variable of light_freq to 50 Hz.

In step S420, when the banding value banding_value is not smaller than a threshold Thr, it indicates that the waveform forming the signal Y_Diff_Sum(n) has no fixed frequency flicker effect, and accordingly step S430 sets the variable of light_freq to 60 Hz because it is correct to assume that a background light source is at 60 Hz.

In step S450, when the variable of light_freq has to be changed from 60 Hz to 50 Hz or from 50 Hz to 60 Hz, the signal flicker_correction is generated.

In step S410, when the frame number is not equal to N, step S410 is re-started at next frame.

The flowcharts of FIGS. 3 and 4 can be implemented easily by a person skilled in the art with a hardware description language such as System C, Verilog or VHDL, and thus a detailed description is deemed unnecessary.

Figure 5:
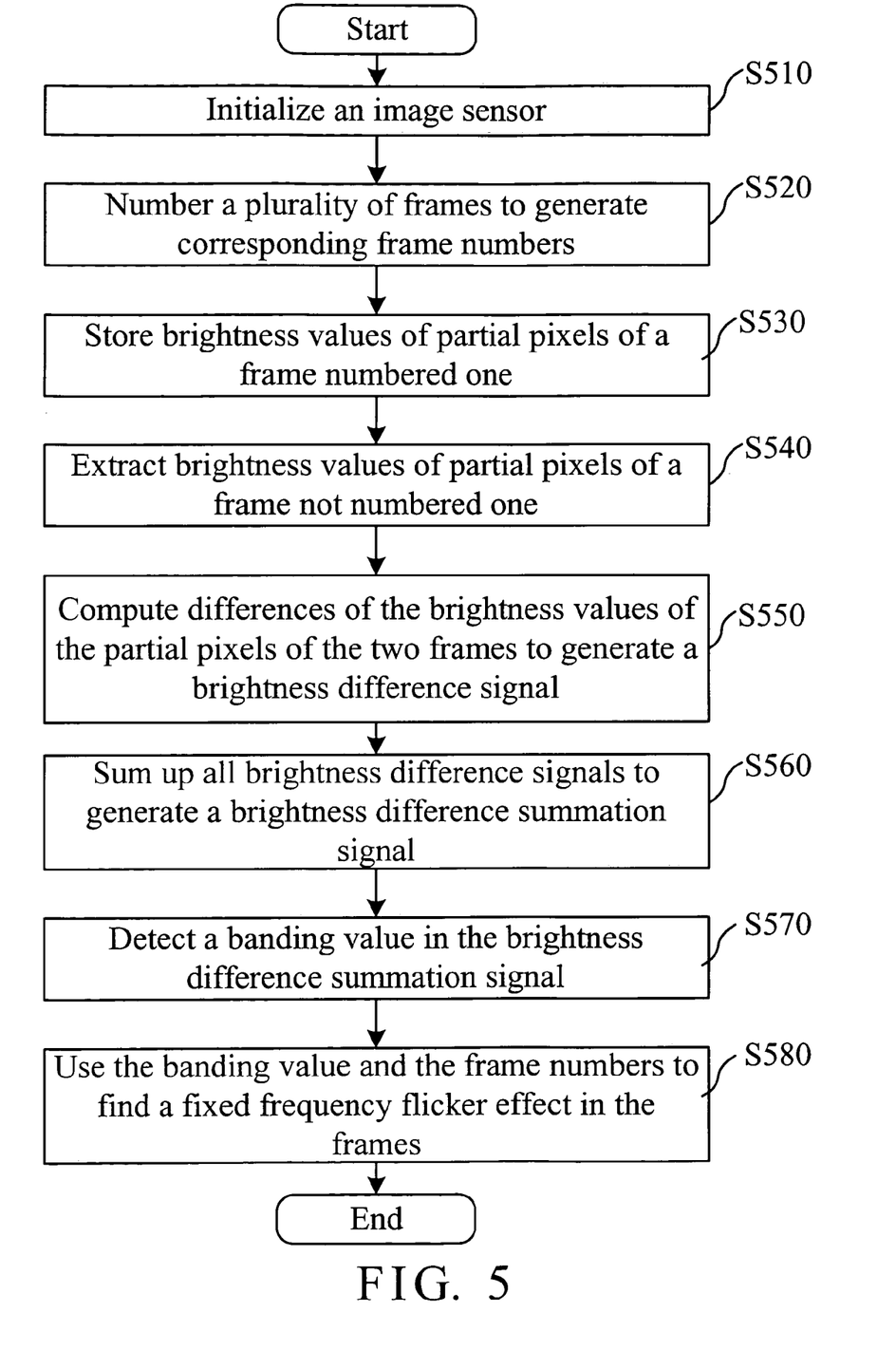
FIG. 5 is a flowchart of an automatic flicker detection and correction method in a video capture device in accordance with the invention.

FIG. 5 is a flowchart of an automatic flicker detection and correction method in the video capture device 100 in accordance with the invention. As shown in FIG. 5, step S510 initializes the image sensor 110, which sets the shutter time of the image sensor 110 to 1/120 sec. and a frame rate of the image sensor 110 to 30 frame/second (FPS), and adjusts a gain of the image sensor 110 in order to extract the frames.

Step S520 numbers the frames in order to generate the frame numbers corresponding to the frames.

Step S530 stores the brightness values of partial pixels of a frame numbered one.

Step S540 extracts the brightness values of partial pixels of a frame not numbered one.

The positions for storing the partial pixels of the frame numbered one in step S530 correspond to the positions of the partial pixels of the frame not numbered one that are extracted in step S540.

Step S550 computes the differences of the brightness values of the partial pixels of the frames numbered one and not numbered one to accordingly generate the brightness difference signals corresponding to the differences.

Step S560 sums up the brightness difference signals to thereby generate a brightness difference summation signal Y_Diff_Sum(n), which is expressed as follows.

$$Y\_Diff\_Sum(n) = \sum_{x=1}^{k} (|Y_x^n - Y_x^1|), k \leq 1000,$$

where $Y_x^1$ indicates the brightness values of the partial pixels of the processed frame numbered one, $Y_x^n$ indicates the brightness values of the partial pixels of the processed frame not numbered one for N is a positive integer greater than one, and k indicates a number of the partial pixels.

Figure 6:
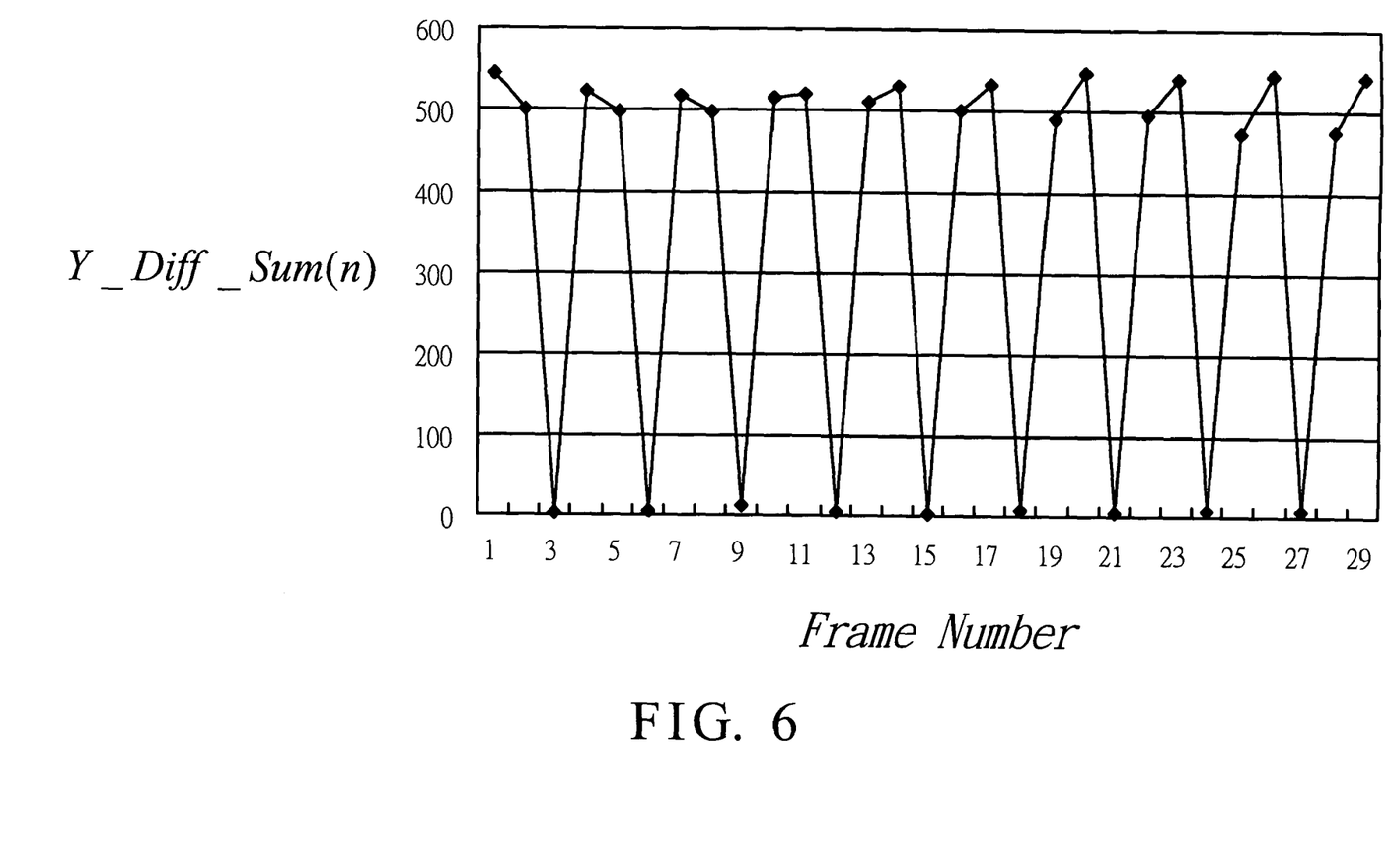
FIG. 6 is a schematic graph of a waveform of a brightness difference summation signal in accordance with the invention.

FIG. 6 is a schematic graph of the waveform of the brightness difference summation signal Y_Diff_Sum(n) in accordance with the invention, where a vertical axis indicates the brightness difference summation signal Y_Diff_Sum(n) and a horizontal axis indicates the frame number.

Step S570 detects a banding value banding_value in the brightness difference summation signal Y_Diff_Sum(n). Step S580 is based on the banding value banding_value and the frame number N to determine whether a fixed frequency flicker effect exists in the frames, i.e., to find a fixed frequency flicker effect in the frames. When the fixed frequency flicker effect exists in the frames, a flicker correction signal flicker_correction is generated to correct the image sensor 110 of the video capture device 100 and further adjust the shutter time of the image sensor 110 as a multiple of 1/100 second.

While the exposure time of the shutter (the shutter time) of the image sensor 110 is set to 1/120 second and the video display rate (the frame rate) is set to 30 frames per second (FPS), a video frame presents a significant flicker effect when the environment light is operated at 50 Hz. Such a flicker effect results from the fixed frequency and wavelength. However, when the environment light is operated at 60 Hz, the video frame does not present any flicker with identical frequency and wavelength.

While the exposure time of the shutter (the shutter time) of the image sensor 110 is set to 1/120 second and the video display rate (the frame rate) is set to 30 frames per second (FPS), every line on the video frame has different exposure amount to different frames. Thus, the total brightness of every line shows flickers, and the number of passed frames required for each flicker is fixed. Namely, on the basis of the brightness of every line in a certain frame and after one bright and dark alternation, the number of passed frames at both a next time and a further next time back to the identical or approximate brightness is identical or approximate, i.e., the brightness of every line can reach around the original value after a fixed number of frames are passed every time.

Upon such an effect, the invention starts at a certain frame (such as Frame 1), and the brightness values of every line of Frame 1 and a frame (such as Frame N) after Frame 1 at corresponding positions are subtracted and taken an absolute operation. The absolute values are added to find a sum of the brightness values between Frame N and Frame 1. On the basis of Frame 1, such an operation is performed on the subsequent frames to thus find successive tens of brightness difference sums. When the flicker effect caused by a light source is too weak, the successive tens of brightness difference sums are very close to thereby lead to a wrong determination. To overcome this, the invention further uses the sum of the absolute values of the brightness differences between corresponding pixels of two frames such as Frame N and Frame 1. Since every pixel of Frame 1 is specially selected, the pixels can be regarded as the best test points. Thus, even when the flicker effect is too weak, the obtained values corresponding to the pixels can be used to easily detect the flickering frequency.

As shown in FIG. 6, when the number of passed frames in every bright and dark alternation is fixed or almost the same, it is determined that the environment light source is at 50 Hz, and otherwise at 60 Hz.

Two exposure time tables can be found in the image sensor controller 140: one for n/120 second (n as a positive integer) suitable for an operation environment with an AC frequency of 60 Hz; the other for n/100 second suitable for an operation environment with an AC frequency of 50 Hz. Accordingly, the invention can automatically detect the AC frequency in a current operation environment as 60 Hz or 50 Hz. The exposure time table based on n/120 second is applied for 60 Hz, and the table based on n/100 second is applied for 50 Hz.

In view of the forgoing, it is known that the invention requires very low computation in detection of the flicker frequency, without the need of the LPF and the derivative calculator that involve multipliers and dividers and relatively increase the IC area and the cost, as cited in the prior art. Further, in the invention, the frame rate on a video display is not reduced since the required computation is very low, and only 1 KB and below temporary memory is required for the video display, which relatively reduces the cost.

Although the present invention has been explained in relation to its preferred embodiment, it is to be understood that many other possible modifications and variations can be made without departing from the spirit and scope of the invention as hereinafter claimed.

What is claimed is:

1. An automatic flicker detection and correction apparatus in a video capture device, comprising:
   a frame number generator for receiving a plurality of frames and accordingly generating frame numbers based on the frames in sequence;
   a storage device connected to the frame number generator to store brightness values of partial pixels of a frame numbered 1;
   an extractor connected to the frame number generator to extract brightness values of partial pixels of a frame numbered N, wherein N is an integer greater than 1;
   a difference summation device connected to the storage device and the extractor to compute differences of the brightness values of the partial pixels of the frames numbered 1 and N and to sum up the differences to thereby generate a brightness difference summation signal;
   a flicker detector connected to the difference summation device to detect a banding value in the brightness difference summation signal; and
   a flicker corrector connected to the flicker detector and the frame number generator to use the banding value and the frame numbers to find a fixed frequency flicker effect in the frames and to generate a flicker correction signal for correcting an image sensor of the video capture device when the fixed frequency flicker effect in the frames is found.

2. The apparatus as claimed in claim 1, wherein positions for storing the partial pixels of the frame numbered 1 in the storage device correspond to positions of the partial pixels of the frame numbered N that are extracted by the extractor.

3. The apparatus as claimed in claim 2, wherein the brightness difference summation signal generated by the difference summation device is expressed as:

$$Y\_Diff\_Sum(n) = \sum_{x=1}^{k} (|Y_x^n - Y_x^1|), k \leq 1000,$$

where $Y_x^1$ indicates the brightness values of the partial pixels of the frame numbered 1, $Y_x^n$ indicates the brightness values of the partial pixels of the frame numbered N, and k indicates a number of the partial pixels.

4. A video capture device with automatic flicker detection and correction, comprising:
   an image sensor for capturing a plurality of frames;
   an image processor connected to the image sensor to perform an image processing on the frames to thereby produce a plurality of processed frames;
   an automatic flicker detection and correction apparatus connected to the image processor for receiving the processed frames, computing brightness differences of partial pixels of a processed frame numbered 1 and multiple processed frames numbered N, summing up the brightness differences to accordingly generate a brightness difference summation signal, detecting a banding value in the brightness difference summation signal to thereby determine whether a fixed frequency flicker effect exists in the processed frames, and generating a flicker correction signal when the fixed frequency flicker exists in the frames, wherein N is an integer greater than 1; and
   an image sensor controller connected to the image sensor and the automatic flicker detection and corrector apparatus to use the flicker correction signal to adjust operating parameters of the image sensor.

5. The device as claimed in claim 4, wherein the image sensor controller sets a shutter time of the image sensor to $1/120$ second when the video capture device is powered on.

6. The device as claimed in claim 5, wherein the image sensor controller sets a frame rate of the image sensor to 30 frames/second when the video capture device is powered on.

7. The device as claimed in claim 6, wherein the image sensor controller adjusts a gain of the image sensor when the video capture device is powered on, thereby extracting the frames.

8. The device as claimed in claim 6, wherein the image sensor controller changes the shutter time of the image sensor into a multiple of $1/100$ second when the flicker correction signal is received.

9. The device as claimed in claim 4, wherein the automatic flicker detection and correction apparatus comprises:
   a frame number generator for receiving the processed frames and accordingly generating frame numbers based on the processed frames in sequence;
   a storage device connected to the frame number generator to store brightness values of the partial pixels of the processed frame numbered one;
   an extractor connected to the frame number generator to extract brightness values of partial pixels of each processed frame numbered N, wherein N is an integer greater than 1;
   a difference summation device connected to the storage device and the extractor to compute differences of the brightness values of the partial pixels of the processed frame numbered 1 and each processed frame numbered N and sum up the differences to thereby generate a partial brightness difference summation signal;
   a flicker detector connected to the difference summation device to detect the banding value in the brightness difference summation signal; and a flicker corrector connected to the flicker detector and the frame number generator to use the banding value and the frame numbers to find a fixed frequency flicker effect in the processed frames and to generate the flicker correction signal when the fixed frequency flicker effect in the processed frames is found.

10. The device as claimed in claim 9, wherein positions for storing the partial pixels of the processed frame numbered 1 in the storage device correspond to positions of the partial pixels of the processed frame numbered N that are extracted by the extractor.

11. The device as claimed in claim 10, wherein the partial brightness difference summation signal generated by the difference summation device is expressed as:

$$Y\_Diff\_Sum(n) = \sum_{x=1}^{k} (|Y_x^n - Y_x^1|), k \leq 1000,$$

where $Y_x^1$ indicates the brightness values of the partial pixels of the processed frame numbered 1, $Y_x^n$ indicates the brightness values of the partial pixels of the processed frame numbered N, and k indicates a number of the partial pixels.

12. An automatic flicker detection and correction method in a video capture device, comprising the steps:
   (A) numbering a plurality of frames to accordingly generate frame numbers;
   (B) storing brightness values of partial pixels of a frame numbered 1;
   (C) extracting brightness values of partial pixels of a frame numbered N, wherein N is an integer greater than 1;
   (D) calculating differences of the brightness values of the partial pixels of the frames numbered 1 and N, and summing the differences to accordingly generate a brightness difference summation signal;
   (E) detecting a banding value in the brightness difference summation signal; and
   (F) using the banding value and the frame numbers to find a fixed frequency flicker effect in the frames, and generating a flicker correction signal to accordingly correct an image sensor of the video capture device when the fixed frequency flicker effect in the frames is found.

13. The method as claimed in claim 12, wherein step (F) is based on the flicker correction signal to change a shutter time of the image sensor into a multiple of 1/100 second.

14. The method as claimed in claim 13, further comprising the steps before step (A):
   (A1) setting the shutter time of the image sensor to 1/120 second;
   (A2) setting a frame rate of the image sensor to 30 frames per second (FPS); and
   (A3) adjusting a gain of the image sensor to thereby extract the frames.

15. The method as claimed in claim 12, wherein positions for storing the partial pixels of the processed frame numbered one in step (B) correspond to positions of the partial pixels of the processed frame numbered N that are extracted in step (C).

16. The method as claimed in claim 13, wherein the brightness difference summation signal is expressed as:

$$Y\_Diff\_Sum(n) = \sum_{x=1}^{k} (|Y_x^n - Y_x^1|), k \leq 1000,$$

where $Y_x^1$ indicates the brightness values of the partial pixels of the frame numbered 1, $Y_x^n$ indicates the brightness values of the partial pixels of the frame numbered N, and k indicates a number of the partial pixels.

* * * * *